UNITED STATES PATENT OFFICE.

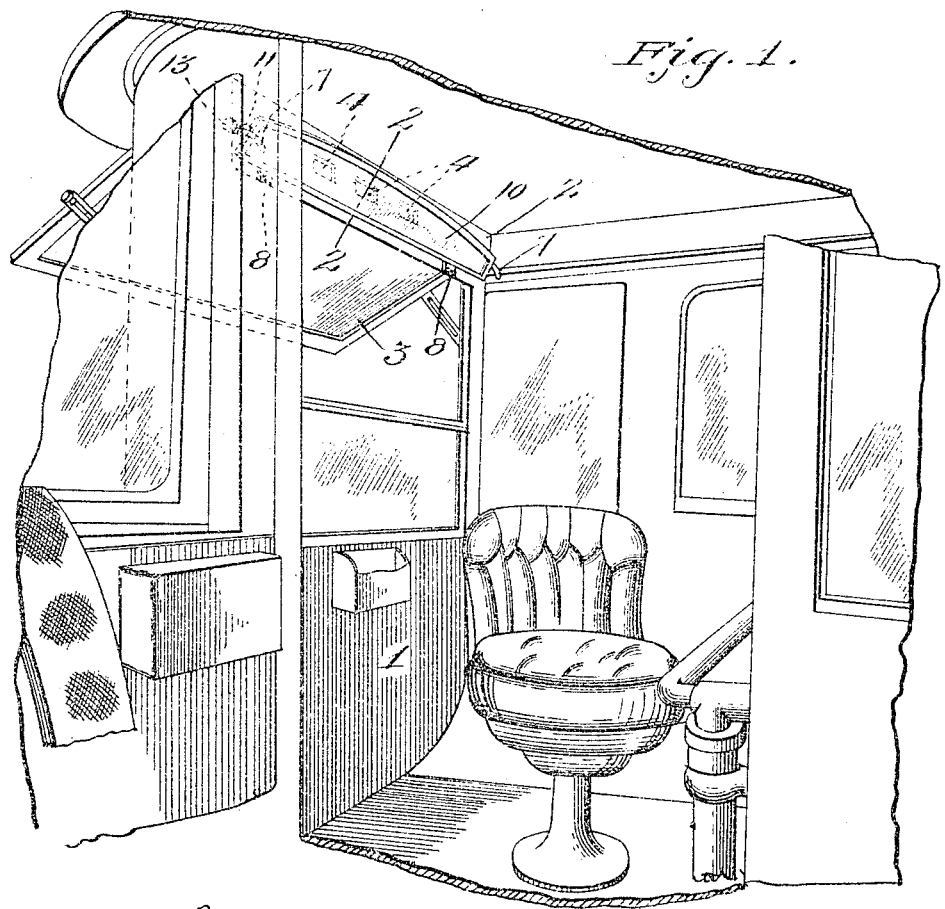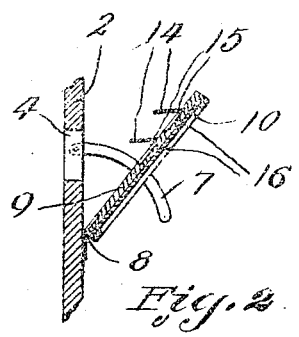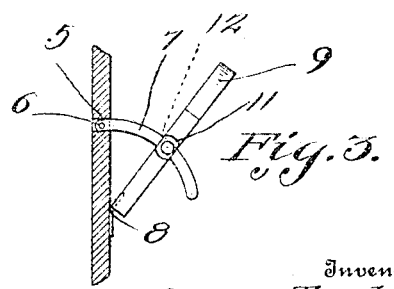

GEORGE TAYLOR, OF NEW YORK, N. Y., ASSIGNOR TO EMIL GROSSMAN M'F'G CO. INC., OF BROOKLYN, NEW YORK, A CORPORATION OF NEW YORK.

MIRROR ATTACHMENT FOR BROUGHAMS AND THE LIKE.

1,120,654.  Specification of Letters Patent.  Patented Dec. 8, 1914.

Application filed April 27, 1914. Serial No. 834,732.

*To all whom it may concern:*

Be it known that I, GEORGE TAYLOR, a subject of King George of England, residing at New York, in the county of New York and State of New York, have invented a new and useful Mirror Attachment for Broughams and the like; and I do hereby declare the following to be a full, clear, and exact description of the invention, such as will enable others skilled in the art to which it appertains to make and use the same.

This invention relates to an improved mirror holder attachment adapted for use in connection with broughams, automobiles and the like and located adjustably above the wind shield in the upper forward corner of the brougham or automobile, in such position that the operator may observe the vehicles that follow.

One of the features of the invention is the provision of ventilating openings in the rear of the holder for ventilating the interior of the vehicle, said holder being adjustable and acting as a deflector for deflecting the draft of air adjacent the top of the vehicle.

The invention comprises further features and combination of parts, as hereinafter set forth, shown in the drawings and claimed.

In the drawings:—Figure 1 is a perspective view of a fragmentary portion of a brougham, showing the application of the mirror holder and deflector. Fig. 2 is a sectional view on line 2—2 of Fig. 1 showing the mirror holder and ventilator deflector. Fig. 3 is an end elevation of the holder, showing the segmental plate, on which the holder is adjustable having one of its ends pivoted in a recess of the forward upper portion of the top of the vehicle.

Referring to the drawings 1 designates a portion of the brougham, automobile or the like, the top portion 2 of which immediately above the upper wind shield 3 is provided with ventilating openings 4, designed to permit of a circulation of air adjacent the top of the vehicle. Pivotally connected in a recess 5 at each side of the part 2 as at 6 is a segmental arm 7. Hinged at 8 to the lower part of the portion 2 of the vehicle adjacent the upper wind shield 3 is a holder 9, which holds or carries a mirror 10, in which the vehicles and the like in the rear are reflected, for the full benefit of the operator, in order to permit him to steer and handle the car or vehicle accordingly. The ends of the holder are provided with swiveled knobs 11, through openings 12 of which said arms 7 extend, there being thumb screws 13 threaded into said knobs and engaging the arms, in order to hold the holder with its mirror in adjusted positions, thereby not only arranging the mirror in order to attain the proper reflection of the vehicles and the like in the rear, but also to deflect the air draft through the openings 4 properly. On the rear face of the holder is a pair of flexible members 14 connected in any suitable manner as at 15 to the holder, so that when the holder is in position as shown in Fig. 2, said flexible members will remain substantially in the positions shown in Fig. 2, thereby constituting means to break the force of the air draft through the openings 4. Incident to the incoming air draft, these members 14 slightly flex. When the holder 9 is closed, said members 14 (which extend the full length of the holder) contact with the top portion 2 of the automobile body and close within the recesses 16. When the holder 9 is thrown open as shown in Fig. 2, said members 14 automatically assume the positions shown in Fig. 2, owing to being flexible and also being resiliently or flexibly connected at 15 to the holder adjacent said recesses 16, in order, as before stated, to break the force of air through the openings 4. When the holder is thrown flat against the portion 2 of the upper part of the brougham or vehicle in order to close the ventilating openings 4, said flexible members are received in correspondingly shaped recesses 16 of the rear face of the holder.

The holder not only acts as an air deflector, but also as a means for controlling the ventilation through the openings 4, and also acting as a holder for the mirror.

The invention having been set forth, what is claimed as new and useful is:—

1. In combination with a vehicle body having ventilating openings in its upper forward portion, a member hinged to said portion adjacent said openings constituting means for regulating and deflecting the air draft and acting as a holder for a mirror, means upon the rear of said member for breaking the force of the draft, and means for adjusting said member.

2. In combination with a vehicle body having ventilating openings in its upper forward portion, a member hinged to said portion adjacent said openings constituting means for regulating and deflecting the air draft and acting as a holder for a mirror, means upon the rear of said member for breaking the force of the draft, swiveled knobs carried by the ends of said member and provided with openings, segmental arms pivoted to the upper portion of the body extending through said openings of the mouth, and means carried by the knob engaging said arms for holding the member in adjusted positions.

In testimony whereof I have signed my name to this specification in the presence of two subscribing witnesses.

GEORGE TAYLOR.

Witnesses:
MABEL HUBBARD,
FRED. A. HUBBARD.